United States Patent
Tang

(10) Patent No.: US 12,328,741 B2
(45) Date of Patent: *Jun. 10, 2025

(54) RESOURCE SCHEDULING METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/059,590

(22) Filed: Nov. 29, 2022

(65) Prior Publication Data

US 2023/0091477 A1 Mar. 23, 2023

Related U.S. Application Data

(63) Continuation of application No. 16/625,383, filed as application No. PCT/CN2017/096118 on Aug. 4, 2017, now Pat. No. 11,553,517.

(51) Int. Cl.
*H04W 72/23* (2023.01)
*H04W 72/04* (2023.01)

(52) U.S. Cl.
CPC ........... *H04W 72/23* (2023.01); *H04W 72/04* (2013.01)

(58) Field of Classification Search
CPC .............................. H04W 72/23; H04W 72/04
See application file for complete search history.

(56) References Cited

U.S. PATENT DOCUMENTS 11,310,775 B2 4/2022 Babaei
2013/0322413 A1 12/2013 Pelletier et al.
(Continued)

FOREIGN PATENT DOCUMENTS

CN 104335654 A 2/2015
CN 105338637 A 2/2016
(Continued)

OTHER PUBLICATIONS

Ericsson. Resource Allocation for D2D Transmitters in Coverage. 3GPP TSG-RAN WG2#85 Tdoc R2-140625. Feb. 14, 2014 (Feb. 14, 2014), pp. 1-5.
(Continued)

*Primary Examiner* — Rhonda L Murphy
(74) *Attorney, Agent, or Firm* — PERKINS COIE LLP

(57) ABSTRACT

The embodiments of the application relate to a resource scheduling method, a terminal device and a network device. The method includes that: a first terminal device receives indication information and resource grant information from a network device, the resource grant information being to indicate a granted resource allocated to the first terminal device by the network device and the indication information being to indicate that the granted resource is configured to transmit data born on a target logical channel; and the first terminal device transmits the data born on the target logical channel to a second terminal device through the granted resource according to the indication information and the resource grant information. According to the resource scheduling method, terminal device and network device of the embodiments of the application, flexible configuration of a transmission resource for a terminal device in a special application scenario may be implemented.

20 Claims, 6 Drawing Sheets

(56) References Cited

U.S. PATENT DOCUMENTS

| | | | |
|---|---|---|---|
| 2016/0100345 | A1 | 4/2016 | Thangarasa et al. |
| 2017/0048745 | A1 | 2/2017 | Yi et al. |
| 2017/0223711 | A1* | 8/2017 | Wang ................... H04L 5/0039 |
| 2017/0257876 | A1 | 9/2017 | Loehr et al. |
| 2017/0303277 | A1 | 10/2017 | Wang et al. |
| 2018/0368132 | A1* | 12/2018 | Babaei ................... H04W 76/11 |
| 2019/0342903 | A1 | 11/2019 | Yu et al. |
| 2020/0059821 | A1 | 2/2020 | Wirth et al. |

FOREIGN PATENT DOCUMENTS

| | | |
|---|---|---|
| CN | 105517159 A | 4/2016 |
| CN | 106376085 A | 2/2017 |
| CN | 106961741 A | 7/2017 |
| EP | 3051736 A1 | 8/2016 |
| EP | 3629643 A1 | 4/2020 |
| JP | 2016503999 A | 2/2016 |
| RU | 2566670 C1 | 10/2015 |
| TW | 201349916 A | 12/2013 |
| WO | 2017053637 A1 | 3/2017 |

OTHER PUBLICATIONS

International Search Report in the international application No. PCT/CN2017/096118, mailed on Apr. 28, 2018.
ZTE: "Consideration on the LCP for data duplication", 3GPP Draft: R2-1704666 Consideration on the LCP for Data Duplication, 3rd Generation Partnership Project (3GPP), Mobile Competence Centre; 650, Route Deslucioles : F-06921 Sophia-Antipolis Cedex F, vol. RAN WG2, No. Hangzhou, China; May 15, 2017-May 19, 2017 May 14, 2017 (May 14, 2017), XP051275211, Retrieved from the Internet: URL: http://www.3gpp. org/ftp/Meetings 3GPP SYNC/RAN2/Docs/ [ retrieved on May 14, 2017] * Section 2. Discussion *.
NTT DOCOMO et al: "On carrier aggregation for sidelink v2x", 3GPP Draft: R1-1708426 CA V2X Phase 2, 3rd Generation Partnership Project (3GPP), Mobile Competence Centre: 650, Route Deslucioles: F-06921 Sophia-Antipolis Cedex; France, vol. RAN WG1, No. Hangzhou; May 15, 2017-May 19, 2017 May 14, 2017 (May 14, 2017), XP051273619, Retrieved from the Internet: URL: http://www.3gpp. org/ftp/Meetings 3GPP SYNC/RAN1/Docs/ [ retrieved on May 14, 2017] * Section 2.2.1. Resource allocation *.
English translation of the Written Opinion of the International Search Authority in the international application No. PCT/CN2017/096118, mailed on Apr. 28, 2018.
Supplementary European Search Report in the European application No. 17920442.5, mailed on Apr. 15, 2020.
Huawei, CATT, LG Electronics, HISilicon, China Unicom,"Revision of WI: V2X phase 2 based on LTE", 3GPP TSG RAN Meeting #76 RP-171069, Florida, USA, Jun. 5-8, 2017.
First Office Action of the Russian application No. 2020102031, issued on Sep. 15, 2020.
First Office Action of the Chinese application No. 201911303951.5, issued on Nov. 3, 2020.
First Office Action of the Chilean application No. 202000027, issued on Jan. 20, 2021.
Ericsson: "Further aspects of data duplication in PDCP layer", 3GPP Draft; R2-1700834—Further Aspects of Data Duplication in PDCP Layer, 3rd Generation Partnership Project (3GPP), Mobile Competence Centre; 650. Route Des Lucioles; F-06921 Sophia-Antipolis Ced vol. RAN WG2, No. Athens, Greece; Feb. 13, 2017-Feb. 17, 2017 Feb. 12, 2017 (Feb. 12, 2017), XP051211616.
Nokia et al: "Duplication Impacts to MAC", 3GPP Draft; R2-1704272 Duplication Impacts to MAC, 3rd Generation Partnership Project(3GPP), Mobile Competence Centre; 650, Route Des Lucioles; F-06921 Sophia-Antipolis Cedex; France, vol. RAN WG2, No. Hangzhou, China; May 15, 2017-May 19, 2017 May 14, 2017(May 14, 2017), XP051274850.
First Office Action of the European application No. 17920442.5, issued on Jan. 21, 2021.
First Office Action of the Indian application No. 202017000320, issued on Apr. 30, 2021.
First Office Action of the Canadian application No. 3066924, issued on Feb. 16, 2021.
Second Office Action of the Chilean application No. 202000027, issued on May 19, 2021.
Samsung, KT, SK Telecom, PDCP duplication support in high layer functional split [online], 3GPP TSG-RAN WG3 Meeting Ad Hoc R3-172252, [the date of search Jun. 25, 2021], the Internet <URL: https://www.3gpp.org/ftp/TSG_RAN/WG3_lu/TSGR3_AHGs/R3_AH_NR_1706/Docs/R3-172252.zip>, Jun. 20, 2017, and p. 1-4.
OPPO, Packet duplication in CA-based eV2x [online], 3 GPP TSG-RAN2 Meeting #99 R2-1707699, [the date of search Jun. 25, 2021], the Internet <URL: https://www.3gpp.org/ftp/TSG_RAN/WG2_RL2/TSGR2_99/Docs/R2-1707699.zip>, Aug. 11, 2017, p. 1-3.
OPPO, Resource selection in CA-based eV/2x [online], 3GPP TSG-RAN2 Meeting #99 R2-1707701, [The date of search Jun. 25, 2021], Internet <URL: https://www.3gpp.org/ftp/TSG_RAN/WG2_RL2/TSGR2_99/Docs/R2-1707701.zip>, Aug. 11, 2017, p. 1-4.
First Office Action of the Japanese application No. 2020-500880, issued on Jul. 6, 2021.
Second Office Action of the European application No. 17920442.5 , issued on Jul. 12, 2021.
Written Opinion of the Singaporean application No. 11201911601Q, issued on Sep. 3, 2021. 8 pages.
First Office Action of the Taiwanese application No. 107127063, issued on Oct. 8, 2021. 19 pages with English translation.
Sharp; "PDCP Duplication in CA", 3GPP TSG-RAN2 Adhoc Meeting Qingdao, China, Jun. 27-29, 2017, R2-1706791. 6 pages.
First Office Action of the Korean application No. 10-2020-7000478, issued on Nov. 19, 2021. 13 pages with English translation.
Second Office Action of the Canadian application No. 3066924, issued on Jan. 4, 2022. 6 pages.
European Search Report in the European application No. 22165298.5, mailed on Jun. 14, 2022. 11 pages.
Decision of Refusal of the Korean application No. 10-2020-7000478, issued on May 26, 2022. 8 pages with English translation.
First Office Action of the Israeli application No. 271210, issued on Jun. 30, 2022. 4 pages.
Non-Final Office Action of the U.S. Appl. No. 16/625,383, issued on May 26, 2021.
Final Office Action of the U.S. Appl. No. 16/625,383, issued on Dec. 13, 2021.
Advisory Action of the U.S. Appl. No. 16/625,383, issued on Feb. 24, 2022.
Non-Final Office Action of the U.S. Appl. No. 16/625,383, issued on Apr. 28, 2022.
First Office Action of the Australian application No. 2017426227, issued on Sep. 28, 2022. 5 pages.
Notice of Allowance of the U.S. Appl. No. 16/625,383, issued on Sep. 2, 2022.
First Office Action of the Chinese application No. 201780088223.X, issued on Jul. 11, 2023. 24 pages with English translation.
Second Office Action of the Chinese application No. 201780088223.X, issued on Dec. 5, 2023. 15 pages with English translation.
Hearing Notice of the Indian application No. 202017000320, issued on Dec. 5, 2023. 3 pages with English translation.
First Office Action of the Brazilian application No. BR1120190279717, issued on Jan. 2, 2024. 8 pages with English translation.
Notice of Allowance of the Chinese application No. 201780088223.X, issued on Mar. 7, 2024. 7 pages with English translation.
First Office Action of the Malaysian application No. PI2019007102, issued on Apr. 30, 2024. 4 pages.
First Office Action of the European application No. 22165298.5, issued on Jan. 21, 2025. 6 pages.

* cited by examiner

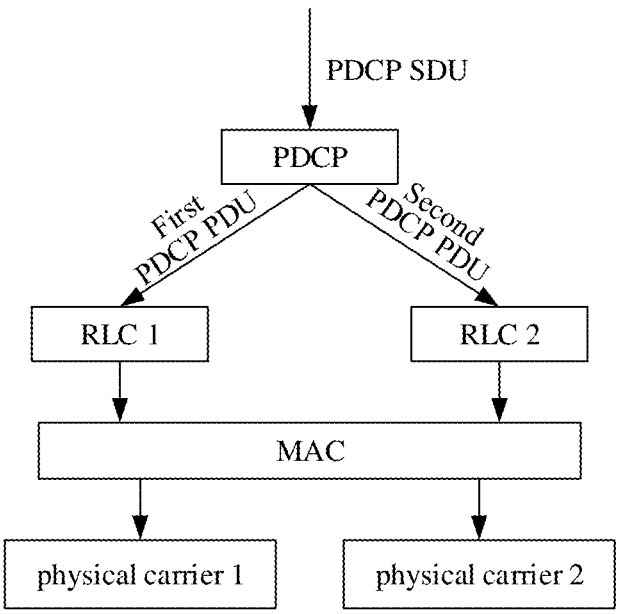

A network device configures a granted resource for a first terminal device, the granted resource being configured for the first terminal device to transmit data to a second terminal device — S210

The network device transmits resource grant information and indication information to the first terminal device, the resource grant information being to indicate the granted resource, and the indication information being to indicate that the granted resource is configured to transmit data born on a target logical channel — S220

```
A first terminal device receives information of the
first corresponding relationship and resource grant
information from a network device, the resource      ─── S310
grant information being to indicate a granted
resource allocated to the first terminal device by the
network device
```

```
The first terminal device determines according to
the information of the first corresponding
relationship that the granted resource is a resource  ─── S320
for transmitting data based on a specific TTI
```

```
The first terminal device determines a target logical ─── S330
channel corresponding to the specific TTI
```

```
The first terminal device transmits data born on the
target logical channel to a second terminal device    ─── S330
through the granted resource
```

```
A network device configures a granted resource for a
first terminal device, the granted resource being a   ─── S410
resource for transmitting data based on a specific TTI
```

```
The network device transmits resource grant
information and information of a first corresponding
relationship to the first terminal device, the resource
grant information being to indicate the granted
resource, the first corresponding relationship
information being for the first terminal device to    ─── S420
determine a target logical channel corresponding to the
specific TTI, and the granted resource being configured
for the first terminal device to transmit data born on the
target logical channel to a second terminal device
```

FIG. 6

RESOURCE SCHEDULING METHOD, TERMINAL DEVICE, AND NETWORK DEVICE

This is a continuation application of U.S. patent application Ser. No. 16/625,383, filed Dec. 20, 2019, which is a U.S. national stage of International Patent Application No. PCT/CN2017/096118 filed on Aug. 4, 2017. The aforementioned applications are incorporated herein by reference in their entirety.

TECHNICAL FIELD

The application relates to the field of communications, and more particularly to a resource scheduling method, a terminal device and a network device.

BACKGROUND

Internet of vehicles system is a Sidelink (SL) transmission technology based on Long Term Evolution (LTE) Device to Device (D2D). Unlike a conventional LTE system which receives or sends communication data through a base station, an Internet of vehicles system adopts D2D communication and thus is higher in spectrum efficiency and lower in transmission delay.

In 3rd Generation Partnership Project (3GPP) Release 14 (Rel-14), a Vehicle to Vehicle (V2V) technology is standardized, and two transmission modes are defined: mode 3 and mode 4. In the mode 3, a transmission resource of Vehicle User Equipment (VUE) is allocated by a base station, and the VUE performs data transmission with other VUE on an SL according to the resource allocated by the base station. Moreover, a resource for single transmission may be allocated by the base station to the VUE and a resource for semi-persistent transmission may be also allocated to the VUE.

For a Carrier Aggregation (CA) scenario, a terminal device supports data duplication. A duplicated Packet Data Convergence Protocol (PDCP) Protocol Data Unit (PDU) is transmitted through a data duplication function of PDCP to two Radio Link Control (RLC) entities, namely corresponding to two different logical channels, and it is finally ensured that the duplicated PDCP PDU may be transmitted on different physical aggregated carriers, thereby achieving a frequency diversity gain to improve reliability of data transmission.

In addition, a terminal device may transmit some specific services through short Transmission Time Intervals (sTTIs). For example, the sTTI may be 0.5 ms, which indicates that the terminal device adopts a 0.5 ms resource for transmission. Compared with a conventional 1 ms resource, the granularity of 0.5 ms resource improves delay performance.

However, for the CA scenario or a scenario where service data is transmitted through an sTTI, a process that a base station configures a transmission resource is not defined in a conventional art.

SUMMARY

The application provides a method for resource scheduling, a terminal device and a network device, which may implement flexible configuration of a transmission resource for a terminal device in a special application scenario.

A first aspect provides a method for resource scheduling, which may include that: a first terminal device receives indication information and resource grant information from a network device, the resource grant information being to indicate a granted resource allocated to the first terminal device by the network device and the indication information being to indicate that the granted resource is configured to transmit data born on a target logical channel; and the first terminal device transmits the data born on the target logical channel to a second terminal device through the granted resource according to the indication information and the resource grant information.

A second aspect provides a resource scheduling method, which may include that: a network device configures a granted resource for a first terminal device, the granted resource being configured for the first terminal device to transmit data to a second terminal device; and the network device transmits resource grant information and indication information to the first terminal device, the resource grant information being to indicate the granted resource and the indication information being to indicate that the granted resource is configured to transmit data born on a target logical channel.

A third aspect provides a terminal device, which is configured to execute the method in the first aspect or any possible implementation mode of the first aspect. Specifically, the terminal device includes units configured to execute the method in the first aspect.

A fourth aspect provides a network device, which is configured to execute the method in the second aspect or any possible implementation mode of the second aspect. Specifically, the network device includes units configured to execute the method in the second aspect.

BRIEF DESCRIPTION OF DRAWINGS

FIG. 3 is a schematic diagram of duplication and transmission of PDCP data according to an embodiment of the application.

FIG. 4 is another schematic flowchart of a resource scheduling method according to an embodiment of the application.

FIG. 5 is yet another schematic flowchart of a resource scheduling method according to an embodiment of the application.

FIG. 6 is still another schematic flowchart of a resource scheduling method according to an embodiment of the application.

DETAILED DESCRIPTION

The technical solutions in the embodiments of the application will be described below in combination with the drawings.

It is to be understood that the technical solutions of the embodiments of the application may be applied to various communication systems, for example, an LTE system, an LTE Frequency Division Duplex (FDD) system, an LTE Time Division Duplex (TDD) system, a 4.5th Generation (4.5G) network, a 5th Generation (5G) network and New Radio (NR). The embodiments of the application may also be applied to a Vehicle to Everything (V2X) system such as a V2V system, or may further be applied to a D2D system. The embodiments of the application are not limited thereto.

It is to be understood that a network device involved in the embodiments of the application is a device deployed in a Radio Access Network (RAN) to provide a wireless communication function for a terminal device. The network device may be a base station, and the base station may include macro base stations, micro base stations, relay stations, access points and the like in various forms. In systems adopting different radio access technologies, a device with a base station function may have different names. For example, it is called an Evolved NodeB (eNB or eNodeB) in an LTE network, and is called a Node B in a 3rd Generation (3G) network, etc.

It is to be understood that the terminal device in the embodiments of the application may also be called a terminal, User Equipment (UE), a Mobile Station (MS), a Mobile Terminal (MT) and the like. The terminal device may be VUE, for example, a vehicle or a wireless terminal for self driving. Or, the terminal device may also be Pedestrian User Equipment (PUE), for example, a mobile phone, a pad, a computer with a wireless transceiver function, or the like.

Figures 1, 2:
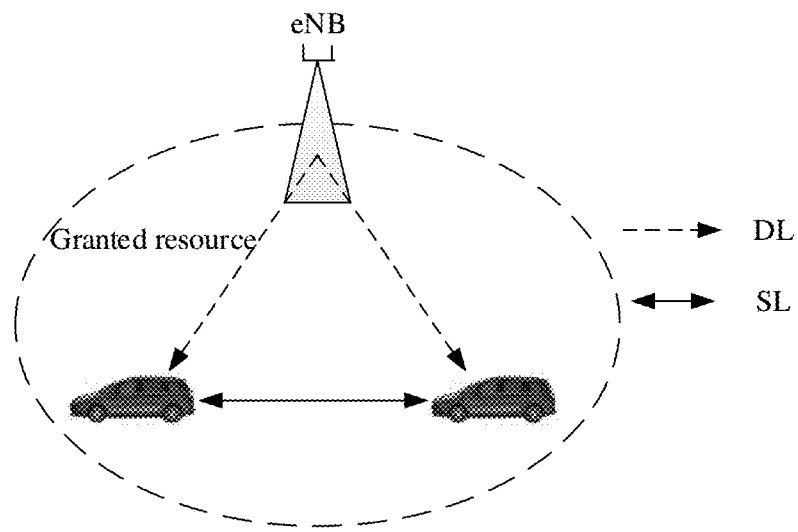
FIG. 1 is a schematic diagram of an Internet of vehicles system according to an embodiment of the application.
FIG. 2 is a schematic flowchart of a resource scheduling method according to an embodiment of the application.

FIG. 1 is a schematic diagram of an Internet of vehicles system according to an embodiment of the application. As shown in FIG. 1, the embodiment of the application may be applied to various application scenarios. Here, descriptions are made with a network device and a terminal device in the Internet of things system as an example. The network device may be an eNB, the terminal device may be VUE, and the VUE includes vehicle 1 and vehicle 2.

In 3GPP Rel-14, a V2V technology is standardized, and two transmission modes are defined: mode 3 and mode 4. In the mode 3, a transmission resource of VUE is allocated by a base station, and data transmission is performed between the VUE and another VUE on an SL according to the resource allocated by the base station. Moreover, the base station may allocate a resource for single transmission to the VUE and may also allocate a resource for semi-persistent transmission to the VUE.

For example, as shown in FIG. 1, the eNB may configure a granted resource for the vehicle 1 and may transmit resource grant information indicative of the granted resource through a Down Link (DL) in FIG. 1. The vehicle 1 determines the granted resource and transmits data to the vehicle 2 through an SL by use of the granted resource. Or, the eNB may also configure a granted resource for the vehicle 2 through the DL, and then the vehicle 2 transmits data to the vehicle 1 through the SL by use of the granted resource.

FIG. 2 is a schematic flowchart of a method 100 for resource scheduling according to an embodiment of the application. The method 100 may be executed by a terminal device and, for example, may be executed by the VUE shown in FIG. 1, and the VUE may be the vehicle 1 or vehicle 2 in FIG. 1.

As shown in FIG. 2, the method 100 includes the following operations. In S110, a first terminal device receives indication information and resource grant information from a network device, the resource grant information being to indicate a granted resource allocated to the first terminal device by the network device, and the indication information being to indicate that the granted resource is configured to transmit data born on a target logical channel. In S120, the first terminal device transmits the data born on the logical channel to a second terminal device through the granted resource according to the indication information and the resource grant information.

It is to be understood that the first terminal device and the second terminal device may be any terminal devices, the first terminal device may be one or more terminal devices, for example, a group of terminal devices, and similarly, the second terminal device may also be one or more terminal devices, for example, a group of terminal devices. The embodiment of the application is not limited thereto.

In the embodiment of the application, the granted resource occupied by data sending of the first terminal device to the second terminal device may be configured through the network device, namely the first terminal device may transmit the data to the second terminal device through the granted resource configured by the network device. For example, the first terminal device may be a terminal device working based on Rel-14, and the first terminal device may be in the mode 3.

It is to be understood that the method 100 may be applied to duplication and transmission in a CA scenario. The duplication and transmission may refer to a duplication function of a PDCP layer, i.e., duplicating data of a PDCP PDU and transmitting the PDCP PDU data through two RLC entities. Or, the duplication and transmission may refer to duplicating data of a PDCP Service Data Unit (SDU) and transmitting the duplicated data through two PDCP entities respectively. The embodiment of the application is not limited thereto.

Optionally, the duplication and transmission may refer to duplicating data of a PDCP PDU. Specifically, FIG. 3 is a schematic diagram of duplication and transmission of PDCP data according to an embodiment of the application. As shown in FIG. 3, one PDCP entity is bound with two RLC entities. The terminal device duplicates a first PDCP PDU which is to be transmitted to obtain a second PDCP PDU. The terminal device transmits the first PDCP PDU to one RLC entity which is called RLC1 in the two RLC entities and transmits the second PDCP PDU to the other RLC entity which is called RLC2 in the two RLC entities. The two RLC entities process the received PDCP PDUs respectively. The first PDCP PDU and the second PDCP PDU, after passing through a MAC layer, are transmitted to the network device through two different carriers, for example, as shown in FIG. 3, through physical carrier 1 and physical carrier 2 respectively. A process that the two RLC entities process the received PDCP PDUs is the same as a manner adopted by a single RLC entity to process a PDCP PDU in case of no duplication in the conventional art and will not be elaborated herein.

It is to be understood that the duplication and transmission may include duplication and transmission of a Signaling Radio Bearer (SRB) and/or a Data Radio Bearer (DRB).

In S110, the first terminal device receives the indication information and resource grant information from the network device, the resource grant information being to indicate the granted resource allocated to the first terminal device by the network device and the indication information being to indicate that the granted resource is configured to transmit the data born on the target logical channel.

In the embodiment of the application, the network device configures the granted resource for the first terminal device and may further indicate, through the indication information, a specific logical channel where the data may be transmitted through the granted resource to the first terminal device. For example, for the CA scenario, the first terminal device may perform data duplication and transmission, and then the network device may indicate to the terminal device through the indication information whether the granted resource may be configured to transmit duplicated data or not. Specifically, the indication information may indicate that the granted resource is configured to transmit the data of the target logical channel. If the target logical channel can transmit the duplicated data, the granted resource is configured to transmit the duplicated data; otherwise, if the target logical channel cannot be configured to transmit the duplicated data, the data transmitted through the granted resource and born on the target logical channel is non-duplicated data.

Optionally, the network device may further indicate to the terminal device, through the indication information, whether to bear the duplicated data through the target logical channel or not.

Specifically, for the CA scenario, when there is duplicated data required to be transmitted in the first terminal device, a network device may indicate that the duplicated data is transmitted through multiple logical channels in the first terminal device and the duplicated data may further be transmitted through the granted resource configured by the network device. Specifically, for any terminal device, the terminal device may be called a first terminal device, and duplicated data may be transmitted in the first terminal device. The network device may configure the granted resource for the first terminal device, and the granted resource may be a resource for transmitting the duplicated data, namely the granted resource may be configured to transmit data corresponding to different logical channels, the different logical channels corresponding to the same data bearer; or the granted resource may also be a resource not for transmitting the duplicated data, namely the granted resource is configured to transmit other data than the duplicated data. The network device may transmit the indication information and the resource grant information to the first terminal device, the resource grant information being to indicate the granted resource allocated to the first terminal device by the network device and the indication information being to indicate whether the granted resource may be configured to transmit the duplicated data or not, namely whether the granted resource may be configured to transmit the same data bearer corresponding to different logical channels or not.

In S120, the first terminal device transmits the data born on the target logical channel to the second terminal device through the granted resource according to the indication information and the resource grant information.

Optionally, the indication information may indicate that the granted resource may not be configured to transmit the duplicated data, and then the first terminal device may transmit other data than the duplicated data to the second terminal device through the granted resource. For example, the granted resource may be configured to transmit the data born on the target logical channel, and the data born on the target logical channel is not duplicated data.

Optionally, as an embodiment, the indication information may be configured to indicate that the granted resource may be configured to transmit the duplicated data, namely the first terminal device may transmit the same data bearer corresponding to different logical channels to the second terminal device through the granted resource. Specifically, the duplicated data may correspond to a first logical channel and a second logical channel respectively, the first logical channel and the second logical channel corresponding to the same data bearer. The granted resource may include a first granted resource and a second granted resource, and the target logical channel may include a first logical channel and a second logical channel. The first granted resource may be configured for the first terminal device to transmit data corresponding to the first logical channel to the second terminal device, and the second granted resource may be configured for the first terminal device to transmit data corresponding to the second logical channel to the second terminal device.

Specifically, descriptions will be made below with the condition that the first terminal device may transmit the duplicated data as an example. Moreover, the network device may configure the granted resource for the first terminal device, the granted resource being configured to transmit the duplicated data. The first terminal device may receive the resource grant information and the indication information. Before transmitting the duplicated data through the granted resource, the first terminal device may determine a first corresponding relationship between the first logical channel and the first granted resource and a second corresponding relationship between the second logical channel and the second granted resource.

Optionally, as an embodiment, the first terminal device may determine a corresponding relationship between the first logical channel and a first carrier and a corresponding relationship between the second logical channel and a second carrier at first. Specifically, the first terminal device may receive information of the second corresponding relationship from the network device, and the first terminal device may determine the corresponding relationship between the first logical channel and the first carrier and the corresponding relationship between the second logical channel and the second carrier according to the information of the second corresponding relationship. Or, the first terminal device may independently determine the corresponding relationship between the first logical channel and the first carrier and the corresponding relationship between the second logical channel and the second carrier and transmit information of a third corresponding relationship to the network device, the information of the third corresponding relationship being for the network device to determine the corresponding relationship between the first logical channel and the first carrier and the corresponding relationship between the second logical channel and the second carrier, such that the network device may further determine the first granted resource corresponding to the first logical channel and the second granted resource corresponding to the second logical channel.

Optionally, the first terminal device may receive the information of the second corresponding relationship transmitted by the network device and determines the corresponding relationship between the first logical channel and the first carrier and the corresponding relationship between the second logical channel and the second carrier according to the information of the second corresponding relationship. Specifically, the information of the second corresponding relationship transmitted by the network device may be RRC signaling, a MAC CE or DCI. In addition, the information of the second corresponding relationship may indicate the corresponding relationships based on a granularity of logical channel, a granularity of logical channel group or a granularity of destination address, namely the information of the second corresponding relationship may include a corresponding relationship between a carrier and a logical channel, a logical channel group or a destination address. The embodiment of the application is not limited thereto.

For example, the information of the second corresponding relationship may adopt the granularity of logical channel, namely the information of the second corresponding relationship may include a corresponding relationship between multiple logical channels and multiple carriers, and the multiple logical channels may include the first logical channel and/or the second logical channel, namely the information of the second corresponding relationship may include the corresponding relationship between the first logical channel and the first carrier and/or the corresponding relationship between the second logical channel and the second carrier. Then, the first terminal device, according to the information of the second corresponding relationship, may map the data born on the first logical channel onto the first carrier and map the data born on the second logical channel onto the second carrier. The first carrier and the second carrier may be any two different carriers.

For another example, the information of the second corresponding relationship may adopt the granularity of logical channel group, namely the information of the second corresponding relationship transmitted by the network device may include a corresponding relationship between at least one logical channel group and a carrier. Specifically, the at least one logical channel group may include a first logical channel group and/or a second logical channel group. If the at least one logical channel group includes the first logical channel group, namely the information of the second corresponding relationship may include a corresponding relationship between the first logical channel group and the first carrier, the first logical channel group may include n logical channels, the n logical channels include the first logical channel and do not include the second logical channel and all the n logical channels correspond to the first carrier, the first terminal device may determine the corresponding relationship between the first logical channel and the first carrier. If the at least one logical channel group includes the second logical channel group, namely the information of the second corresponding relationship may include a corresponding relationship between the second logical channel group and the second carrier, the second logical channel group may include m logical channels, the m logical channels include the second logical channel and do not include the first logical channel and all the m logical channels correspond to the second carrier, the first terminal device may determine the corresponding relationship between the second logical channel and the second carrier. Both n and m are positive integers greater than 1.

It is to be understood that the information of the second corresponding relationship may also include both a corresponding relationship between a logical channel and a carrier and a corresponding relationship between a logical channel group and a carrier. For example, the information of the second corresponding relationship may include the corresponding relationship between the first logical channel group and the first carrier, the first logical channel group including the first logical channel, and then the first terminal device may determine the corresponding relationship between the first logical channel and the first carrier. The information of the second corresponding relationship may also include corresponding relationship information between one or more logical channels and one or more carriers and does not adopt the granularity of logical channel group, and the first terminal device may further determine the corresponding relationship between the second logical channel and the second carrier. However, the embodiment of the application is not limited thereto.

Optionally, the first terminal device may independently determine the corresponding relationship between the first logical channel and the first carrier and the corresponding relationship between the second logical channel and the second carrier. The first terminal device may transmit information of a third corresponding relationship to the network device and indicate the corresponding relationship between the first logical channel and the first carrier and the corresponding relationship between the second logical channel and the second carrier through the information of the third corresponding relationship. Specifically, the information of the third corresponding relationship transmitted to the network device by the first terminal device may be RRC signaling, a MAC CE or DCI.

In addition, the first terminal device may determine the corresponding relationship between the logical channel and the carrier and report the same to the network device through the information of the third corresponding relationship. The information of the third corresponding relationship may also indicate the corresponding relationship based on the granularity of logical channel, the granularity of logical channel group or the granularity of destination address, namely the information of the third corresponding relationship may include the corresponding relationship between a logical channel, a logical channel group or a destination address and a carrier. The embodiment of the application is not limited thereto.

For example, the information of the third corresponding relationship may adopt the granularity of logical channel, namely the information of the third corresponding relationship may include a corresponding relationship between multiple logical channels and multiple carriers, and the multiple logical channels include the first logical channel and/or the second logical channel, namely the information of the third corresponding relationship includes the corresponding relationship between the first logical channel and the first carrier and/or the corresponding relationship between the second logical channel and the second carrier, the first carrier and the second carrier being any two different carriers, such that the network device may determine the corresponding relationship between the first logical channel and the first carrier and the corresponding relationship between the second logical channel and the second carrier according to the information of the third corresponding relationship.

For another example, the information of the third corresponding relationship may adopt the granularity of logical channel group, namely the information of the third corresponding relationship transmitted to the network device may include a corresponding relationship between at least one logical channel group and a carrier. Specifically, the at least one logical channel group may include a third logical channel group and/or a fourth logical channel group. If the at least one logical channel group includes the third logical channel group, namely the information of the third corresponding relationship may include a corresponding relationship between the third logical channel group and the first carrier, the third logical channel group may include k logical channels, the k logical channels include the first logical channel and do not include the second logical channel and all the k logical channels correspond to the first carrier, then the network device may determine the corresponding relationship between the first logical channel and the first carrier. If the at least one logical channel group includes the fourth logical channel group, namely the information of the third corresponding relationship may include a corresponding relationship between the fourth logical channel group and the second carrier, the fourth logical channel group may include l logical channels, the l logical channels include the second logical channel and do not include the first logical channel and all the l logical channels correspond to the second carrier, then the network device may determine the corresponding relationship between the second logical channel and the second carrier. Both k and l are positive integers greater than 1.

It is to be understood that the information of the third corresponding relationship may also include both the corresponding relationship between a logical channel and a carrier and the corresponding relationship between a logical channel group and a carrier. For example, the information of the third corresponding relationship may include the corresponding relationship between the first logical channel group and the first carrier, the first logical channel group including the first logical channel, and then the network device may determine the corresponding relationship between the first logical channel and the first carrier. The information of the third corresponding relationship may also include corresponding relationship information between one or more logical channels and one or more carriers and does not adopt the granularity of logical channel group, and the network device may further determine the corresponding relationship between the second logical channel and the second carrier. However, the embodiment of the application is not limited thereto.

In the embodiment of the application, the first terminal device determines the corresponding relationship between the first logical channel and the first carrier and the corresponding relationship between the second logical channel and the second carrier, the first terminal device may further receive the information of the first corresponding relationship transmitted by the network device and determine the corresponding relationship between the first carrier and the first granted resource and the corresponding relationship between the second granted resource and the second carrier according to the information of the first corresponding relationship, and then the first terminal device may determine the first corresponding relationship between the first granted resource and the first logical channel according to the corresponding relationship between the first logical channel and the first carrier and the corresponding relationship between the first carrier and the first granted resource and, similarly, may also determine the second corresponding relationship between the second granted resource and the second logical channel according to the corresponding relationship between the second logical channel and the second carrier and the corresponding relationship between the second carrier and the second granted resource.

Specifically, the information of the first corresponding relationship received by the first terminal device from the network device may be born on a control channel. Optionally, the first terminal device may also acquire the indication information through control information, the indication information being to indicate whether the granted resource may be configured to transmit the same data bearer corresponding to different logical channels or not. The first terminal device may further acquire the resource grant information through the control information, the resource grant information being to indicate the granted resource allocated to the first terminal device by the network device. However, the embodiment of the application is not limited thereto.

Optionally, as an embodiment, the first terminal device may receive information of a fourth corresponding relationship transmitted by the network device and directly determine the first corresponding relationship between the first logical channel and the first granted resource and the second corresponding relationship between the second logical channel and the second granted resource according to the information of the fourth corresponding relationship.

It is to be understood that the information of the fourth corresponding relationship received by the first terminal device may include the first corresponding relationship between the first logical channel and the first granted resource and the second corresponding relationship between the second logical channel and the second granted resource. Specifically, the fourth corresponding relationship may include a Logical Channel Identity (LCID) of at least one logical channel, the at least one corresponding logical channel is determined according to the LCID of the at least one logical channel, and a data duplication function of the at least one logical channel is in an on state, namely data born on the at least one logical channel is duplicated data.

A corresponding relationship between the at least one logical channel and a granted resource may be included in the information of the fourth corresponding relationship and used to indicate that the granted resource may be configured to transmit the data corresponding to the at least one logical channel and including the first corresponding relationship between the first logical channel and the first granted resource and the second corresponding relationship between the second logical channel and the second granted resource. For other logical channels that are not indicated, it is considered as a default that data duplication and transmission are not supported or the data duplication and transmission function is off, namely data born on other logical channels may be transmitted on any other granted resources. The first terminal device may determine according to the information of the fourth corresponding relationship that the first granted resource is configured to transmit the data born on the first logical channel, and the second granted resource is configured to transmit the data born on the second logical channel.

Optionally, the information of the fourth corresponding relationship received by the first terminal device from the network device may be born on a control channel. Optionally, the first terminal device may also acquire the indication information through control information, the indication information being used to indicate whether the granted resource may be configured to transmit the same data bearer corresponding to different logical channels or not. The first terminal device may further acquire the resource grant information through control information, the resource grant information being used to indicate the granted resource allocated to the first terminal device by the network device. However, the embodiment of the application is not limited thereto.

Specifically, the information of the fourth corresponding relationship may be control information born on the control channel, and the first terminal device may contain a bitmap corresponding to all LCIDs supported by the first terminal device in the control information in the control channel. For example, if there are totally 16 logical channels for the first terminal device, the control information contains a 16 bit bitmap. For values in the bitmap: 0 may indicate that the granted resource is unavailable for the corresponding logical channel and 1 may indicate that the granted resource is available for the corresponding logical channel. In addition, all the logical channels for which the granted resource is indicated by the bitmap to be available may be logical channels that may be configured to transmit duplicated data or logical channels that may not be configured to transmit duplicated data.

In such a manner, according to the resource scheduling method of the embodiment of the application, the terminal device determines a granted resource available to transmit duplicated data through indication information and the granted resource which are transmitted by the network device and transmits the duplicated data to another terminal device through the granted resource, so that resource allocation for transmission of duplicated data in the CA scenario is implemented.

The resource scheduling method according to the embodiments of the application is described above in combination with FIG. 1 to FIG. 3 in detail from the angle of the terminal device. The resource scheduling method according to the embodiments of the application will be described below in combination with FIG. 4 from the angle of the network device.

FIG. 4 is a schematic flowchart of a method 200 for resource scheduling according to an embodiment of the application. The method 200 may be executed by a network device.

As shown in FIG. 4, the method 200 includes the following operations. In S210, the network device configures a granted resource for a first terminal device, the granted resource being configured for the first terminal device to transmit data to a second terminal device. In S220, the network device transmits resource grant information and indication information to the first terminal device, the resource grant information being used to indicate the granted resource, and the indication information being used to indicate that the granted resource is configured to transmit data born on a target logical channel.

In such a manner, according to the resource scheduling method of the embodiment of the application, the network device may transmit the indication information and the granted resource to the terminal device to enable the terminal device to determine the granted resource available to transmit duplicated data and transmit the duplicated data to another terminal device through the granted resource, so that resource allocation for transmission of the duplicated data in a CA scenario is implemented.

Optionally, as an embodiment, the indication information may indicate that the granted resource may be configured to transmit the same data bearer corresponding to different logical channels, the granted resource includes a first granted resource and a second granted resource, the target logical channel includes a first logical channel and a second logical channel, the first granted resource is configured for the first terminal device to transmit first data born on the first logical channel to the second terminal device, and the second granted resource is configured for the first terminal device to transmit second data born on the second logical channel to the second terminal device, the first logical channel and the second logical channel corresponding to the same data bearer.

Optionally, as an embodiment, the method 200 may further include that: the network device determines a corresponding relationship between the first logical channel of the first terminal device and a first carrier and a corresponding relationship between the second logical channel and a second carrier; the network device determines a corresponding relationship between the first carrier and the first granted resource and a corresponding relationship between the second carrier and the second granted resource according to the corresponding relationship between the first logical channel and the first carrier and the corresponding relationship between the second logical channel and the second carrier; and the network device transmits information of a first corresponding relationship to the first terminal device, the information of the first corresponding relationship being for the first terminal device to determine the corresponding relationship between the first carrier and the first granted resource and the corresponding relationship between the second carrier and the second granted resource.

Optionally, as an embodiment, after the operation that the network device determines the corresponding relationship between the first logical channel and the first carrier and the corresponding relationship between the second logical channel and the second carrier, the method may further include that: the network device transmits information of a second corresponding relationship to the first terminal device, the information of the second corresponding relationship being used for the first terminal device to determine the corresponding relationship between the first logical channel and the first carrier and the corresponding relationship between the second logical channel and the second carrier.

Optionally, as an embodiment, the information of the second corresponding relationship may include a corresponding relationship between a first logical channel group and the first carrier, the first logical channel group may include n logical channels, and the n logical channels may include the first logical channel and not include the second logical channel, n being a positive integer greater than 1; and/or, the information of the second corresponding relationship may include a corresponding relationship between a second logical channel group and the second carrier, the second logical channel group may include m logical channels, and the m logical channels may include the second logical channel and not include the first logical channel, m being a positive integer greater than 1.

Optionally, as an embodiment, the operation that the network device determines the corresponding relationship between the first logical channel of the first terminal device and the first carrier and the corresponding relationship between the second logical channel and the second carrier may include that: the network device receives information of a third corresponding relationship transmitted by the first terminal device; and the network device determines the corresponding relationship between the first logical channel and the first carrier and the corresponding relationship between the second logical channel and the second carrier according to the information of the third corresponding relationship.

Optionally, as an embodiment, the information of the third corresponding relationship may include a corresponding relationship between a third logical channel group and the first carrier, the third logical channel group includes k logical channels, and the k logical channels include the first logical channel and do not include the second logical channel, k being a positive integer greater than 1; and/or, the information of the third corresponding relationship may include a corresponding relationship between a fourth logical channel group and the second carrier, the fourth logical channel group includes l logical channels, and the l logical channels include the second logical channel and do not include the first logical channel, l being a positive integer greater than 1.

Optionally, as an embodiment, the method 200 may further include that: the network device transmits information of a fourth corresponding relationship to the first terminal device, the information of the fourth corresponding relationship including the corresponding relationship between the first logical channel and the first granted resource and the corresponding relationship between the second logical channel and the second granted resource.

It is to be understood that the network device in the method 200 may correspond to the network device in the method 100 and the first terminal device in the method 200 may correspond to the first terminal device in the method 100. No more elaborations are made herein.

In such a manner, according to the resource scheduling method of the embodiment of the application, the network device transmits indication information and a granted resource to the terminal device to enable the terminal device to determine the granted resource available to transmit duplicated data and transmit the duplicated data to another terminal device through the granted resource, so that resource allocation for transmission of the duplicated data in the CA scenario is implemented.

It is to be understood that configuration of a resource by the network device for data transmission with the terminal device is mainly described above under the CA scenario. Descriptions will be made below for another application scenario.

FIG. 5 is a schematic flowchart of a method 300 for resource scheduling according to another embodiment of the application. The method 300 may be executed by a terminal device, and the terminal device may be any terminal device. For example, the method may be executed by the VUE shown in FIG. 1 and the VUE may be the vehicle 1 or vehicle 2 in FIG. 1.

As shown in FIG. 5, the method 300 includes the following operations. In S310, a first terminal device receives information of a first corresponding relationship and resource grant information from a network device, the resource grant information being to indicate a granted resource allocated to the first terminal device by the network device. In S320, the first terminal device determines according to the information of the first corresponding relationship that the granted resource is a resource for transmitting data based on a specific TTI. In S330, the first terminal device determines a target logical channel corresponding to the specific TTI. In S340, the first terminal device transmits data born on the target logical channel to a second terminal device through the granted resource.

It is to be understood that the first terminal device and the second terminal device may be any terminal devices, the first terminal device may be one or more terminal devices, for example, a group of terminal devices. Similarly, the second terminal device may also be one or more terminal devices, for example, a group of terminal devices. The embodiment of the application is not limited thereto.

In the embodiment of the application, the granted resource occupied by data sending of the first terminal device to the second terminal device may be configured by the network device, namely the first terminal device transmits data to the second terminal device through the granted resource configured by the network device. For example, the first terminal device may be a terminal device working based on Rel-14, and the first terminal device may be in a mode 3.

In the embodiment of the application, when there is a logical channel corresponding to the specific TTI in the first terminal device, the granted resource configured for the first terminal device by the network device may be a granted resource based on the specific TTI. Specifically, the first terminal device receives the information of the first corresponding relationship and resource grant information from the network device, the resource grant information being used to indicate the granted resource allocated to the first terminal device by the network device and the first corresponding relationship information being used to indicate that the granted resource is a resource for transmitting data based on the specific TTI, and then the first terminal device may determine the target logical channel corresponding to the specific TTI and transmit the data corresponding to the target logical channel to the second terminal device based on the specific TTI by use of the granted resource.

It is to be understood that the specific TTI may be a TTI of any length. For example, the specific TTI may be a TTI with a length of 1 ms, or may also be an sTTI of which a length is less than 1 ms. For example, a length of the specific TTI may be 0.5 ms. Adopting an sTTI may improve delay performance.

In the embodiment of the application, when there is data required to be transmitted based on the specific TTI in the first terminal device, the first terminal device may independently determine the target logical channel corresponding to the specific TTI, or the target logical channel corresponding to the specific TTI may be configured by the network device.

Optionally, the first terminal device may configure a direct corresponding relationship between the target logical channel and the specific TTI through the network device, including that: the first terminal device receives information of the second corresponding relationship transmitted by the network device and determines the corresponding relationship between the specific TTI and the target logical channel. Specifically, the network device may determine that there is data required to be transmitted based on the specific TTI in the first terminal device, then the network device may configure for the first terminal device a corresponding relationship between a logical channel and a TTI, which may include the corresponding relationship between the specific TTI and the target logical channel, and the first terminal device may determine the corresponding relationship between the specific TTI and the target logical channel through the information of the second corresponding relationship.

For example, the information of the second corresponding relationship may include a corresponding relationship between multiple logical channels and the specific TTI, all the logical channels corresponding to the specific TTI. Or, the information of the second corresponding relationship may include a corresponding relationship between at least one logical channel group and a TTI, each logical channel group of the at least one logical channel group may include multiple logical channels, the logical channels of each logical channel group may correspond to the same TTI, there is a logical channel group including the target logical channel in the at least one logical channel group, and the target logical channel may correspond to the specific TTI. For another example, the information of the second corresponding relationship may also include a corresponding relationship between multiple logical channels in the first terminal device and TTIs, and different logical channels may correspond to different TTIs and include the target logical channel corresponding to the specific TTI. The embodiment of the application is not limited thereto.

Optionally, the operation that the first terminal device independently determines the target logical channel corresponding to the specific TTI may include that: the first terminal device determines a corresponding relationship between a TTI and a logical channel, which may include the corresponding relationship between the specific TTI and the target logical channel, and transmits information of a third corresponding relationship to the network device to indicate the corresponding relationship between the specific TTI and the target logical channel through the information of the third corresponding relationship.

For example, the information of the third corresponding relationship may include a corresponding relationship between multiple logical channels and the specific TTI, all the logical channels corresponding to the specific TTI. Or, the information of the third corresponding relationship may include a corresponding relationship between at least one logical channel group and a TTI, each logical channel group of the at least one logical channel group may include multiple logical channels, the logical channels in each logical channel group correspond to the same TTI, there is a logical channel group including the target logical channel in the at least one logical channel group, and the target logical channel corresponds to the specific TTI. For another example, the information of the third corresponding relationship may also include a corresponding relationship between multiple logical channels of the first terminal device and TTIs, and different logical channels may correspond to different TTIs and include the target logical channel corresponding to the specific TTI. The embodiment of the application is not limited thereto.

The first terminal device may transmit the information of the third corresponding relationship to the network device for the network device to determine according to the information of the third corresponding relationship that the data born on the target logical channel in the first terminal device is required to be transmitted based on the specific TTI, and then the network device may configure the granted resource for the first terminal device according to the information of the third corresponding relationship, the granted resource being a resource for transmission based on the specific TTI, and transmit the information of the first corresponding relationship to the first terminal device, the information of the first corresponding relationship being to indicate that the granted resource performs transmission based on the specific TTI.

In such a manner, according to the resource scheduling method of the embodiment of the application, the terminal device receives a granted resource transmitted by the network device, a corresponding relationship information of a relationship between the granted resource and a specific TTI may be indicated, and then data born on a target logical channel corresponding to the specific TTI may be transmitted to another terminal device through the granted resource, so that transmission of some data based on the specific TTI is implemented, and the transmission delay may further be shortened.

The resource scheduling method according to the embodiments of the application is described above in combination with FIG. 5 in detail from the angle of the terminal device. The resource scheduling method according to the embodiments of the application will be described below in combination with FIG. 6 from the angle of the network device.

FIG. 6 is a schematic flowchart of a method 400 for resource scheduling according to an embodiment of the application. The method 400 may be executed by a network device.

As shown in FIG. 6, the method 400 includes the following operations. In S410, the network device configures a granted resource for a first terminal device, the granted resource being a resource for transmitting data based on a specific TTI. In S420, the network device transmits resource grant information and information of the first corresponding relationship to the first terminal device, the resource grant information being used to indicate the granted resource, the first corresponding relationship information being used for the first terminal device to determine a target logical channel corresponding to the specific TTI, and the granted resource being configured for the first terminal device to transmit data born on the target logical channel to a second terminal device.

In such a manner, according to the resource scheduling method of the embodiment of the application, the network device may transmit the granted resource to the first terminal device and may indicate the corresponding relationship between the granted resource and the specific TTI through the corresponding relationship information to enable the first terminal device to transmit the data born on the target logical channel corresponding to the specific TTI between itself and another terminal device through the granted resource, so that transmission of some data based on the specific TTI is implemented, and a transmission delay may further be shortened.

Optionally, the method 400 may further include that: the network device determines a corresponding relationship between the target logical channel and the specific TTI; and the operation that the network device configures the granted resource for the first terminal device may include that: the network device configures the granted resource for the terminal device according to the corresponding relationship between the target logical channel and the specific TTI.

Optionally, after the operation that the network device determines the corresponding relationship between the target logical channel and the specific TTI, the method may further include that: the network device transmits information of a second corresponding relationship to the first terminal device, the second corresponding relationship information being used for the first terminal device to determine the corresponding relationship between the target logical channel and the specific TTI.

Optionally, the information of the second corresponding relationship may include a corresponding relationship between at least one logical channel group and the specific TTI, and each of the at least one logical channel group may include multiple logical channels.

Optionally, the operation that the network device determines the corresponding relationship between the target logical channel and the specific TTI may include that: the network device receives information of a third corresponding relationship transmitted by the first terminal device; and the network device determines the corresponding relationship between the target logical channel and the specific TTI according to the information of the third corresponding relationship.

Optionally, the information of the third corresponding relationship may include the corresponding relationship between the at least one logical channel group and the specific TTI, and each of the at least one logical channel group may include multiple logical channels.

Optionally, a length of the specific TTI may be less than 1 ms.

It is to be understood that the network device in the method 400 may correspond to the network device in the method 300 and the first terminal device in the method 400 may correspond to the first terminal device in the method 300. No more elaborations are made herein.

In such a manner, according to the resource scheduling method of the embodiment of the application, the network device may transmit a granted resource to the first terminal device and may indicate a corresponding relationship between the granted resource and a specific TTI through information of the corresponding relationship to enable the first terminal device to transmit data born on the target logical channel corresponding to the specific TTI to another terminal device through the granted resource, so that transmission of some data based on the specific TTI is implemented, and a transmission delay may further be shortened.

It is to be understood that, in various embodiments of the application, a magnitude of a sequence number of each process does not mean an execution sequence and the execution sequence of each process should be determined by its function and an internal logic but should not form any limit to an implementation process of the embodiments of the application.

The resource scheduling method according to the embodiments of the application is described above in combination with FIG. 1 to FIG. 6 in detail and a terminal device and network device according to the embodiments of the application will be described below in combination with FIG. 7 to FIG. 14.

Figure 7:
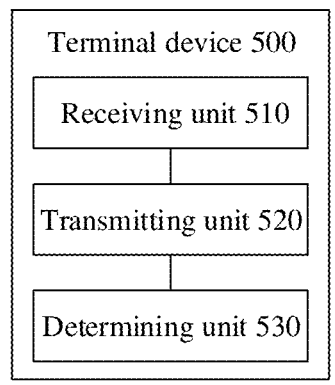
FIG. 7 is a schematic block diagram of a terminal device according to an embodiment of the application.

As shown in FIG. 7, a terminal device 500 according to an embodiment of the application includes a receiving unit 510 and a transmitting unit 520. Optionally, a determining unit 530 may further be included.

Specifically, the receiving unit 510 is configured to receive indication information and resource grant information from a network device, the resource grant information being used to indicate a granted resource allocated to the terminal device by the network device and the indication information being used to indicate that the granted resource is configured to transmit data born on a target logical channel. The transmitting unit 520 is configured to transmit the data born on the target logical channel to a second terminal device through the granted resource according to the indication information and the resource grant information.

In such a manner, the terminal device of the embodiment of the application receives the indication information and granted resource from the network device to determine the granted resource available to transmit duplicated data and transmits the duplicated data to another terminal device through the granted resource, so that resource allocation for transmission of the duplicated data in a CA scenario is implemented.

Optionally, the indication information may indicate that the granted resource is configured to transmit the same data bearer corresponding to different logical channels, the granted resource may include a first granted resource and a second granted resource, the target logical channel may include a first logical channel and a second logical channel, The transmitting unit 520 is specifically configured to transmit first data born on the first logical channel to the second terminal device through the first granted resource and transmit second data born on the second logical channel to the second terminal device through the second granted resource, the first logical channel and the second logical channel corresponding to the same data bearer.

Optionally, the determining unit 530 may be configured to, before the transmitting unit 520 transmits the data born on the target logical channel to the second terminal device through the granted resource according to the indication information and the resource grant information, determine a first corresponding relationship between the first granted resource and a bearer of the first logical channel and a second corresponding relationship between the second granted resource and a bearer of the second logical channel.

Optionally, the determining unit 530 may be specifically configured to determine a corresponding relationship between the first logical channel and a first carrier and a corresponding relationship between the second logical channel and a second carrier. The receiving unit 510 may be specifically configured to receive information of a first corresponding relationship transmitted by the network device. The determining unit 530 may be specifically configured to determine a corresponding relationship between the first carrier and the first granted resource and a corresponding relationship between the second carrier and the second granted resource according to the information of the first corresponding relationship, determine the first corresponding relationship according to the corresponding relationship between the first logical channel and the first carrier and the corresponding relationship between the first carrier and the first granted resource, and determine the second corresponding relationship according to the corresponding relationship between the second logical channel and the second carrier and the corresponding relationship between the second carrier and the second granted resource.

Optionally, the receiving unit 510 may be specifically configured to receive information of a second corresponding relationship transmitted by the network device. The determining unit 530 may be specifically configured to determine the corresponding relationship between the first logical channel and the first carrier and the corresponding relationship between the second logical channel and the second carrier according to the information of the second corresponding relationship.

Optionally, the information of the second corresponding relationship may include a corresponding relationship between a first logical channel group and the first carrier, the first logical channel group may include n logical channels, and the n logical channels include the first logical channel and do not include the second logical channel, n being a positive integer greater than 1; and/or, the information of the second corresponding relationship may include a corresponding relationship between a second logical channel group and the second carrier, the second logical channel group may include m logical channels, and the m logical channels include the second logical channel and do not include the first logical channel, m being a positive integer greater than 1.

Optionally, the transmitting unit 520 may be specifically configured to, after the determining unit 530 determines the corresponding relationship between the first logical channel and the first carrier and the corresponding relationship between the second logical channel and the second carrier, transmit information of a third corresponding relationship to the network device, the third corresponding relationship information being used for the network device to determine the corresponding relationship between the first logical channel and the first carrier and the corresponding relationship between the second logical channel and the second carrier. The receiving unit 510 may be specifically configured to receive the information of the first corresponding relationship determined according to a third corresponding relationship from the network device.

Optionally, the information of the third corresponding relationship may include a corresponding relationship between a third logical channel group and the first carrier, the third logical channel group includes k logical channels, and the k logical channels include the first logical channel and do not include the second logical channel, k being a positive integer greater than 1; and/or, the information of the third corresponding relationship may include a corresponding relationship between a fourth logical channel group and the second carrier, the fourth logical channel group includes l logical channels, and the l logical channels include the second logical channel and do not include the first logical channel, l being a positive integer greater than 1.

Optionally, the determining unit 530 may be specifically configured to receive information of a fourth corresponding relationship transmitted by the network device and determine the first corresponding relationship and the second corresponding relationship according to the information of the fourth corresponding relationship.

It is to be understood that the terminal device 500 according to the embodiment of the application may correspondingly execute the method 100 in the embodiment of the application and the abovementioned and other operations and/or functions of each unit in the terminal device 500 are adopted to implement the corresponding flows executed by the first terminal device in each method in FIG. 1 to FIG. 4 respectively and will not be elaborated herein for simplicity.

In such a manner, the terminal device of the embodiment of the application receives indication information and a granted resource from the network device to determine the granted resource available to transmit the duplicated data and transmits the duplicated data to another terminal device through the granted resource, so that resource allocation for transmission of duplicated data in the CA scenario is implemented.

Figure 8:
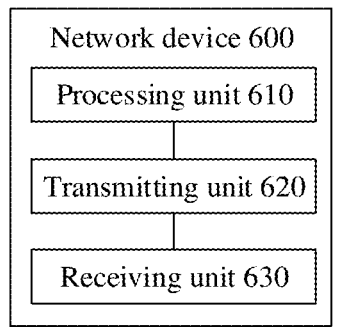
FIG. 8 is a schematic block diagram of a network device according to an embodiment of the application.

As shown in FIG. 8, a network device 600 according to an embodiment of the application includes a processing unit 610 and a transmitting unit 620. Optionally, a receiving unit 630 may further be included.

Specifically, the processing unit 610 is configured to configure a granted resource for a first terminal device, the granted resource being configured for the first terminal device to transmit data to a second terminal device. The transmitting unit 620 is configured to transmit resource grant information and indication information to the first terminal device, the resource grant information being used to indicate the granted resource and the indication information being used to indicate that the granted resource is configured to transmit data born on a target logical channel.

In such a manner, the network device of the embodiment of the application transmits indication information and a granted resource to a terminal device to enable the terminal device to determine the granted resource available to transmit duplicated data and transmit the duplicated data to another terminal device through the granted resource, so that resource allocation for transmission of the duplicated data in a CA scenario is implemented.

Optionally, the indication information may indicate that the granted resource is configured to transmit the same data bearer corresponding to different logical channels, the granted resource includes a first granted resource and a second granted resource, the target logical channel includes a first logical channel and a second logical channel, the first granted resource is configured for the first terminal device to transmit first data born on the first logical channel to the second terminal device, and the second granted resource is configured for the first terminal device to transmit second data born on the second logical channel to the second terminal device, the first logical channel and the second logical channel corresponding to the same data bearer.

Optionally, the processing unit 610 may be specifically configured to determine a corresponding relationship between the first logical channel of the first terminal device and a first carrier and a corresponding relationship between the second logical channel and a second carrier and determine a corresponding relationship between the first carrier and the first granted resource and a corresponding relationship between the second carrier and the second granted resource according to the corresponding relationship between the first logical channel and the first carrier and the corresponding relationship between the second logical channel and the second carrier. The transmitting unit 620 is specifically configured to transmit information of a first corresponding relationship to the first terminal device, the information of the first corresponding relationship being used for the first terminal device to determine the corresponding relationship between the first carrier and the first granted resource and the corresponding relationship between the second carrier and the second granted resource.

Optionally, the transmitting unit 620 may be specifically configured to, after the processing unit 610 determines the corresponding relationship between the first logical channel and the first carrier and the corresponding relationship between the second logical channel and the second carrier, transmit information of a second corresponding relationship to the first terminal device, the second corresponding relationship information being for the first terminal device to determine the corresponding relationship between the first logical channel and the first carrier and the corresponding relationship between the second logical channel and the second carrier.

Optionally, the information of the second corresponding relationship may include a corresponding relationship between a first logical channel group and the first carrier, the first logical channel group includes n logical channels, and the n logical channels include the first logical channel and do not include the second logical channel, n being a positive integer greater than 1; and/or, the information of the second corresponding relationship may include a corresponding relationship between a second logical channel group and the second carrier, the second logical channel group includes m logical channels, and the m logical channels include the second logical channel and do not include the first logical channel, m being a positive integer greater than 1.

Optionally, the receiving unit 630 may be configured to receive information of a third corresponding relationship transmitted by the first terminal device. The processing unit 610 may be specifically configured to determine the corresponding relationship between the first logical channel and the first carrier and the corresponding relationship between the second logical channel and the second carrier according to the information of the third corresponding relationship.

Optionally, the information of the third corresponding relationship may include a corresponding relationship between a third logical channel group and the first carrier, the third logical channel group includes k logical channels, and the k logical channels include the first logical channel and do not include the second logical channel, k being a positive integer greater than 1; and/or, the information of the third corresponding relationship may include a corresponding relationship between a fourth logical channel group and the second carrier, the fourth logical channel group includes l logical channels, and the l logical channels include the second logical channel and do not include the first logical channel, l being a positive integer greater than 1.

Optionally, the transmitting unit 620 may be specifically configured to transmit information of a fourth corresponding relationship to the first terminal device, the information of the fourth corresponding relationship including the corresponding relationship between the first logical channel and the first granted resource and the corresponding relationship between the second logical channel and the second granted resource.

It is to be understood that the network device 600 according to the embodiment of the application may correspondingly execute the method 200 in the embodiment of the application and the abovementioned and other operations and/or functions of each unit in the network device 600 are adopted to implement the corresponding flows executed by the network device in each method in FIG. 1 to FIG. 4 respectively and will not be elaborated herein for simplicity.

In such a manner, the network device of the embodiment of the application transmits indication information and a granted resource to a terminal device to enable the terminal device to determine the granted resource available to transmit duplicated data and transmit the duplicated data to another terminal device through the granted resource, so that resource allocation for transmission of duplicated data in the CA scenario is implemented.

Figure 9:
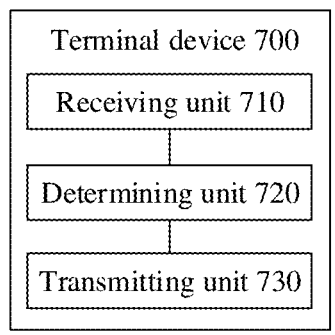
FIG. 9 is another schematic block diagram of a terminal device according to an embodiment of the application.

As shown in FIG. 9, a terminal device 700 according to an embodiment of the application includes a receiving unit 710, a determining unit 720 and a transmitting unit 730.

Specifically, the receiving unit 710 may be configured to receive information of a first corresponding relationship and resource grant information from a network device, the resource grant information being used to indicate a granted resource allocated to the terminal device by the network device. The determining unit 720 may be configured to determine according to the information of the first corresponding relationship that the granted resource is a resource for transmitting data based on a specific TTI. The determining unit 720 may be further configured to determine a target logical channel corresponding to the specific TTI. The transmitting unit 730 may be configured to transmit data born on the target logical channel to a second terminal device through the granted resource.

In such a manner, the terminal device of the embodiment of the application may receive a granted resource transmitted by the network device, the corresponding relationship information of the relationship between the granted resource and the specific TTI may be indicated, and then the data born on the target logical channel corresponding to the specific TTI may be transmitted between the terminal device and another terminal device through the granted resource, so that transmission of some data based on a specific TTI is implemented, and a transmission delay may further be shortened.

Optionally, the determining unit 720 may be specifically configured to, before determining the target logical channel corresponding to the specific TTI, determine a corresponding relationship between the target logical channel and the specific TTI.

Optionally, the receiving unit 710 may be specifically configured to receive information of a second corresponding relationship transmitted by the network device. The determining unit 720 may be specifically configured to determine the corresponding relationship between the target logical channel and the specific TTI according to the information of the second corresponding relationship.

Optionally, the information of the second corresponding relationship may include a corresponding relationship between at least one logical channel group and the specific TTI, and each of the at least one logical channel group may include multiple logical channels.

Optionally, the transmitting unit 730 may be specifically configured to, after the determining unit 720 determines the corresponding relationship between the target logical channel and the specific TTI, transmit information of a third corresponding relationship to the network device, the information of the third corresponding relationship being for the network device to determine the corresponding relationship between the target logical channel and the specific TTI and the information of the first corresponding relationship.

Optionally, the information of the third corresponding relationship may include the corresponding relationship between the at least one logical channel group and the specific TTI, each logical channel group of the at least one logical channel group includes multiple logical channels, and the multiple logical channels correspond to the same TTI.

Optionally, a length of the specific TTI may be less than 1 ms.

It is to be understood that the terminal device 700 according to the embodiment of the application may correspondingly execute the method 300 in the embodiment of the application and the abovementioned and other operations and/or functions of each unit in the terminal device 700 are adopted to implement the corresponding flows executed by the first terminal device in each method in FIG. 5 and FIG. 6 respectively and will not be elaborated herein for simplicity.

In such a manner, the terminal device of the embodiment of the application may receive a granted resource transmitted by the network device, the corresponding relationship information of the relationship between the granted resource and a specific TTI may be indicated, and then data born on the target logical channel corresponding to the specific TTI may be transmitted between the terminal device and another terminal device through the granted resource, so that transmission of some data based on the specific TTI is implemented, and the transmission delay may further be shortened.

Figure 10:
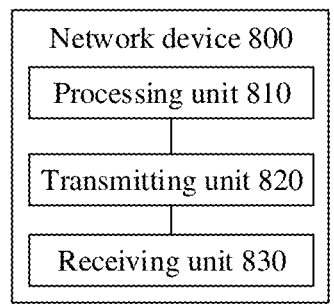
FIG. 10 is another schematic block diagram of a terminal device according to an embodiment of the application.

As shown in FIG. 10, a network device 800 according to an embodiment of the application includes a processing unit 810 and a transmitting unit 820. Optionally, a receiving unit 830 may further be included.

Specifically, the processing unit 810 is configured to configure a granted resource for a first terminal device, the granted resource being a resource for transmitting data based on a specific TTI. The transmitting unit 820 is configured to transmit resource grant information and information of the first corresponding relationship to the first terminal device, the resource grant information being used to indicate the granted resource, the information of the first corresponding relationship being for the first terminal device to determine a target logical channel corresponding to the specific TTI and the granted resource being configured for the first terminal device to transmit data born on the target logical channel to a second terminal device.

In such a manner, the network device of the embodiment of the application may transmit a granted resource to the first terminal device and may indicate a corresponding relationship between the granted resource and a specific TTI through information of the corresponding relationship to enable the first terminal device to transmit the data born on the target logical channel corresponding to the specific TTI with the other terminal device through the granted resource, so that transmission of some data based on the specific TTI is implemented, and a transmission delay may further be shortened.

Optionally, the processing unit 810 may be specifically configured to determine a corresponding relationship between the target logical channel and the specific TTI, and configure the granted resource for the terminal device according to the corresponding relationship between the target logical channel and the specific TTI.

Optionally, the transmitting unit 820 may be specifically configured to, after the processing unit 810 determines the corresponding relationship between the target logical channel and the specific TTI, transmit information of a second corresponding relationship to the first terminal device, the second corresponding relationship information being for the first terminal device to determine the corresponding relationship between the target logical channel and the specific TTI.

Optionally, the information of the second corresponding relationship may include a corresponding relationship between at least one logical channel group and the specific TTI, and each logical channel group of the at least one logical channel group includes multiple logical channels.

Optionally, the receiving unit 830 may be specifically configured to receive information of a third corresponding relationship transmitted by the first terminal device. The processing unit 810 may be specifically configured to determine the corresponding relationship between the target logical channel and the specific TTI according to the information of the third corresponding relationship.

Optionally, the information of the third corresponding relationship may include the corresponding relationship between the at least one logical channel group and the specific TTI, and each logical channel group of the at least one logical channel group includes multiple logical channels.

Optionally, a length of the specific TTI may be less than 1 ms.

It is to be understood that the network device 800 according to the embodiment of the application may correspondingly execute the method 400 in the embodiment of the application and the abovementioned and other operations and/or functions of each unit in the network device 800 are adopted to implement the corresponding flows executed by the network device in each method in FIG. 5 to FIG. 6 respectively and will not be elaborated herein for simplicity.

In such a manner, the network device of the embodiment of the application may transmit a granted resource to the first terminal device and may indicate a corresponding relationship between the granted resource and a specific TTI through information of the corresponding relationship to enable the first terminal device to transmit data born on the target logical channel corresponding to the specific TTI to another terminal device through the granted resource, so that transmission of some data based on the specific TTI is implemented, and the transmission delay may further be shortened.

Figure 11:
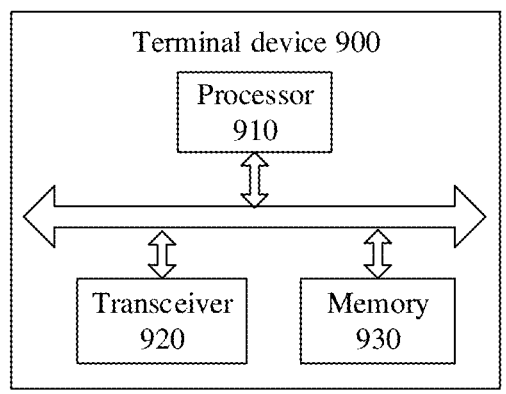
FIG. 11 is yet another schematic block diagram of a terminal device according to an embodiment of the application.

FIG. 11 is a schematic block diagram of a terminal device 900 according to an embodiment of the application. As shown in FIG. 11, the terminal device 900 includes: a processor 910 and a transceiver 920. The processor 910 may be connected with the transceiver 920. Optionally, the terminal device 900 may further include a memory 930. The memory 930 may be connected with the processor 910. The processor 910, the memory 930 and the transceiver 920 may communicate with one another through an internal connecting path for transmission and control of data and/or signals. The memory 930 may be configured to store an instruction. The processor 910 is configured to execute the instruction stored in the memory 930 to control the transceiver 920 to transmit information or signals. The transceiver 920 is configured to receive indication information and resource grant information from a network device, the resource grant information being to indicate a granted resource allocated to the terminal device by the network device and the indication information being to indicate that the granted resource is configured to transmit data born on a target logical channel, and transmit the data born on the target logical channel to a second terminal device through the granted resource according to the indication information and the resource grant information.

In such a manner, the terminal device of the embodiment of the application receives indication information and a granted resource from the network device to determine the granted resource available to transmit duplicated data and transmits duplicated data to another terminal device through the granted resource, so that resource allocation for transmission of the duplicated data in a CA scenario is implemented.

Optionally, the indication information may indicate that the granted resource may be configured to transmit the same data bearer corresponding to different logical channels, the granted resource includes a first granted resource and a second granted resource, the target logical channel includes a first logical channel and a second logical channel, The transceiver 920 may be specifically configured to transmit first data born on the first logical channel to the second terminal device through the first granted resource and transmit second data born on the second logical channel to the second terminal device through the second granted resource, the first logical channel and the second logical channel corresponding to the same data bearer.

Optionally, the processor 910 may be configured to, before the transceiver 920 transmits the data born on the target logical channel to the second terminal device through the granted resource according to the indication information and the resource grant information, determine a first corresponding relationship between the first granted resource and a bearer of the first logical channel and a second corresponding relationship between the second granted resource and a bearer of the second logical channel.

Optionally, the processor 910 may be specifically configured to determine a corresponding relationship between the first logical channel and a first carrier and a corresponding relationship between the second logical channel and a second carrier. The transceiver 920 may be specifically configured to receive information of the first corresponding relationship transmitted by the network device. The processor 910 may be specifically configured to determine a corresponding relationship between the first carrier and the first granted resource and a corresponding relationship between the second carrier and the second granted resource according to the information of the first corresponding relationship, determine the first corresponding relationship according to the corresponding relationship between the first logical channel and the first carrier and the corresponding relationship between the first carrier and the first granted resource and determine the second corresponding relationship according to the corresponding relationship between the second logical channel and the second carrier and the corresponding relationship between the second carrier and the second granted resource.

Optionally, the transceiver 920 may be configured to receive information of the second corresponding relationship from the network device. The processor 910 may be configured to determine the corresponding relationship between the first logical channel and the first carrier and the corresponding relationship between the second logical channel and the second carrier according to the information of the second corresponding relationship.

Optionally, the information of the second corresponding relationship may include a corresponding relationship between a first logical channel group and the first carrier, the first logical channel group includes n logical channels, and the n logical channels include the first logical channel and do not include the second logical channel, n being a positive integer greater than 1; and/or, the information of the second corresponding relationship may include a corresponding relationship between a second logical channel group and the second carrier, the second logical channel group includes m logical channels, and the m logical channels include the second logical channel and do not include the first logical channel, m being a positive integer greater than 1.

Optionally, the transceiver 920 may be specifically configured to, after the processor 910 determines the corresponding relationship between the first logical channel and the first carrier and the corresponding relationship between the second logical channel and the second carrier, transmit information of a third corresponding relationship to the network device, the information of the third corresponding relationship being for the network device to determine the corresponding relationship between the first logical channel and the first carrier and the corresponding relationship between the second logical channel and the second carrier, and receive the information of the first corresponding relationship determined according to a third corresponding relationship from the network device.

Optionally, the information of the third corresponding relationship may include a corresponding relationship between a third logical channel group and the first carrier, the third logical channel group includes k logical channels, and the k logical channels include the first logical channel and do not include the second logical channel, k being a positive integer greater than 1; and/or, the information of the third corresponding relationship may include a corresponding relationship between a fourth logical channel group and the second carrier, the fourth logical channel group includes l logical channels, and the l logical channels include the second logical channel and do not include the first logical channel, l being a positive integer greater than 1.

Optionally, the processor 910 may be specifically configured to receive information of a fourth corresponding relationship transmitted by the network device and determine the first corresponding relationship and the second corresponding relationship according to the information of the fourth corresponding relationship.

It is to be understood that the terminal device 900 according to the embodiment of the application may correspond to the terminal device 500 in the embodiment of the application and may correspond to a corresponding body executing the method 100 according to the embodiment of the application and the abovementioned and other operations and/or functions of each unit in the terminal device 900 are adopted to implement the corresponding flows executed by the first terminal device in each method in FIG. 1 to FIG. 4 respectively and will not be elaborated herein for simplicity.

In such a manner, the terminal device of the embodiment of the application receives indication information and a granted resource from the network device to determine the granted resource available to transmit the duplicated data and transmits the duplicated data to the other terminal device through the granted resource, so that resource allocation for transmission of the duplicated data in the CA scenario is implemented.

Figure 12:
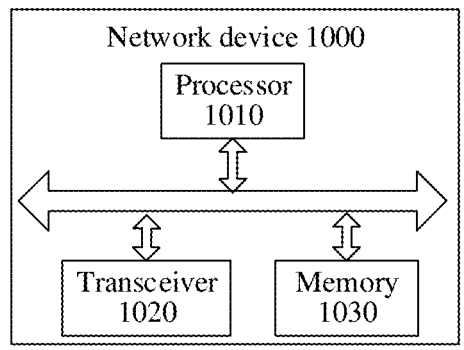
FIG. 12 is still another schematic block diagram of a terminal device according to an embodiment of the application.

FIG. 12 is a schematic block diagram of a network device 1000 according to an embodiment of the application. As shown in FIG. 12, the network device 1000 includes: a processor 1010 and a transceiver 1020. The processor 1010 is connected with the transceiver 1020. Optionally, the network device 1000 may further include a memory 1030. The memory 1030 may be connected with the processor 1010. The processor 1010, the memory 1030 and the transceiver 1020 may communicate with one another through an internal connecting path for transmission and control of data and/or signals. The memory 1030 may be configured to store an instruction. The processor 1010 is configured to execute the instruction stored in the memory 1030 to control the transceiver 1020 to transmit information or signals. The processor 1010 is configured to configure a granted resource for a first terminal device, the granted resource being configured for the first terminal device to transmit data to a second terminal device. The transceiver 1020 is configured to configure the granted resource for the first terminal device, the granted resource being configured for the first terminal device to transmit data to the second terminal device and transmit resource grant information and indication information to the first terminal device, the resource grant information being to indicate the granted resource, and the indication information being to indicate that the granted resource is configured to transmit data born on a target logical channel.

In such a manner, the network device of the embodiment of the application transmits indication information and a granted resource to a terminal device to enable the terminal device to determine the granted resource available to transmit duplicated data and transmit the duplicated data to another terminal device through the granted resource, so that resource allocation for transmission of the duplicated data in a CA scenario is implemented.

Optionally, the indication information may indicate that the granted resource may be configured to transmit the same data bearer corresponding to different logical channels, the granted resource includes a first granted resource and a second granted resource, the target logical channel includes a first logical channel and a second logical channel, the first granted resource is configured for the first terminal device to transmit first data born on the first logical channel to the second terminal device, and the second granted resource is configured for the first terminal device to transmit second data born on the second logical channel to the second terminal device, the first logical channel and the second logical channel corresponding to the same data bearer.

Optionally, the processor 1010 may be configured to determine a corresponding relationship between the first logical channel of the first terminal device and a first carrier and a corresponding relationship between the second logical channel and a second carrier and determine a corresponding relationship between the first carrier and the first granted resource and a corresponding relationship between the second carrier and the second granted resource according to the corresponding relationship between the first logical channel and the first carrier and the corresponding relationship between the second logical channel and the second carrier.

The transceiver 1020 may be configured to transmit information of a first corresponding relationship to the first terminal device, the information of the first corresponding relationship being for the first terminal device to determine the corresponding relationship between the first carrier and the first granted resource and the corresponding relationship between the second carrier and the second granted resource.

Optionally, the transceiver 1020 may be configured to, after the processor 1010 determines the corresponding relationship between the first logical channel and the first carrier and the corresponding relationship between the second logical channel and the second carrier, transmit information of a second corresponding relationship to the first terminal device, the information of the second corresponding relationship being for the first terminal device to determine the corresponding relationship between the first logical channel and the first carrier and the corresponding relationship between the second logical channel and the second carrier.

Optionally, the information of the second corresponding relationship may include a corresponding relationship between a first logical channel group and the first carrier, the first logical channel group includes n logical channels, and the n logical channels include the first logical channel and do not include the second logical channel, n being a positive integer greater than 1; and/or, the information of the second corresponding relationship may include a corresponding relationship between a second logical channel group and the second carrier, the second logical channel group includes m logical channels, and the m logical channels include the second logical channel and do not include the first logical channel, m being a positive integer greater than 1.

Optionally, the transceiver 1020 may be configured to receive information of a third corresponding relationship transmitted by the first terminal device. The processor 1010 may be configured to determine the corresponding relationship between the first logical channel and the first carrier and the corresponding relationship between the second logical channel and the second carrier according to the information of the third corresponding relationship.

Optionally, the information of the third corresponding relationship may include a corresponding relationship between a third logical channel group and the first carrier, the third logical channel group includes k logical channels, and the k logical channels include the first logical channel and do not include the second logical channel, k being a positive integer greater than 1; and/or, the information of the third corresponding relationship may include a corresponding relationship between a fourth logical channel group and the second carrier, the fourth logical channel group includes l logical channels, and the l logical channels include the second logical channel and do not include the first logical channel, l being a positive integer greater than 1.

Optionally, the transceiver 1020 may be configured to transmit information of a fourth corresponding relationship to the first terminal device, the information of the fourth corresponding relationship including the corresponding relationship between the first logical channel and the first granted resource and the corresponding relationship between the second logical channel and the second granted resource.

It is to be understood that the network device 1000 according to the embodiment of the application may correspond to the network device 600 in the embodiment of the application and may correspond to a body executing the method 100 according to the embodiment of the application and the abovementioned, and other operations and/or functions of each unit in the network device 1000 are adopted to implement the corresponding flows executed by the network device in each method in FIG. 1 to FIG. 4 respectively and will not be elaborated herein for simplicity.

In such a manner, the network device of the embodiment of the application transmits indication information and a granted resource to a terminal device to enable the terminal device to determine the granted resource available to transmit the duplicated data and transmit the duplicated data to the other terminal device through the granted resource, so that resource allocation for transmission of the duplicated data in the CA scenario is implemented.

Figure 13:
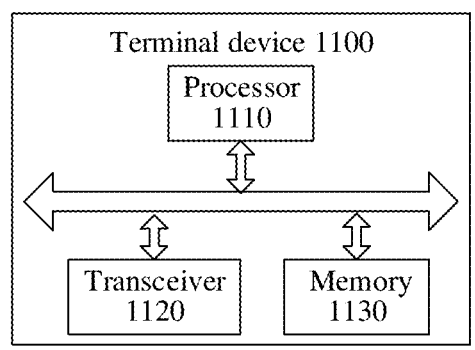
FIG. 13 is another schematic block diagram of a terminal device according to an embodiment of the application.

FIG. 13 is a schematic block diagram of a terminal device 1100 according to an embodiment of the application. As shown in FIG. 13, the terminal device 1100 includes: a processor 1110 and a transceiver 1120. The processor 1110 is connected with the transceiver 1120. Optionally, the terminal device 1100 may further include a memory 1130. The memory 1130 may be connected with the processor 1110. The processor 1110, the memory 1130 and the transceiver 1120 may communicate with one another through an internal connecting path for transmission and control of data and/or signals. The memory 1130 may be configured to store an instruction. The processor 1110 is configured to execute the instruction stored in the memory 1130 to control the transceiver 1120 to transmit information or signals. The transceiver 1120 is configured to receive information of a first corresponding relationship and resource grant information from a network device, the resource grant information being used to indicate a granted resource allocated to the terminal device by the network device. The processor 1110 is configured to determine according to the information of the first corresponding relationship that the granted resource is a resource for transmitting data based on a specific TTI. The processor 1110 is configured to determine a target logical channel corresponding to the specific TTI. The transceiver 1120 is configured to transmit data born on the target logical channel to a second terminal device through the granted resource.

In such a manner, the terminal device of the embodiment of the application may receive the granted resource transmitted by the network device, the corresponding relationship information of the relationship between the granted resource and the specific TTI may be indicated, and then the data born on the target logical channel corresponding to the specific TTI may be transmitted between itself and another terminal device through the granted resource, so that transmission of some data based on the specific TTI is implemented, and a transmission delay may further be shortened.

Optionally, the processor 1110 may be configured to, before determining the target logical channel corresponding to the specific TTI, determine a corresponding relationship between the target logical channel and the specific TTI.

Optionally, the transceiver 1120 may be configured to receive information of a second corresponding relationship transmitted by the network device. The processor 1110 may be configured to determine the corresponding relationship between the target logical channel and the specific TTI according to the information of the second corresponding relationship.

Optionally, the information of the second corresponding relationship may include a corresponding relationship between at least one logical channel group and the specific TTI, and each logical channel group of the at least one logical channel group includes multiple logical channels.

Optionally, the transceiver 1120 may be configured to, after the processor 1110 determines the corresponding relationship between the target logical channel and the specific TTI, transmit information of a third corresponding relationship to the network device, the information of the third corresponding relationship being for the network device to determine the corresponding relationship between the target logical channel and the specific TTI and the information of the first corresponding relationship.

Optionally, the information of the third corresponding relationship may include the corresponding relationship between the at least one logical channel group and the specific TTI, each logical channel group of the at least one logical channel group includes multiple logical channels, and the multiple logical channels correspond to the same TTI.

Optionally, a length of the specific TTI may be less than 1 ms.

It is to be understood that the terminal device 1100 according to the embodiment of the application may correspond to the terminal device 700 in the embodiment of the application and may correspond to a corresponding body executing the method 300 according to the embodiment of the application and the abovementioned and other operations and/or functions of each unit in the terminal device 1100 are adopted to implement the corresponding flows executed by the first terminal device in each method in FIG. 5 to FIG. 6 respectively and will not be elaborated herein for simplicity.

In such a manner, the terminal device of the embodiment of the application may receive the granted resource transmitted by the network device, the corresponding relationship information of the relationship between the granted resource and the specific TTI may be indicated, and then the data born on the target logical channel corresponding to the specific TTI may be transmitted between itself and another terminal device through the granted resource, so that transmission of some data based on the specific TTI is implemented, and the transmission delay may further be shortened.

Figure 14:
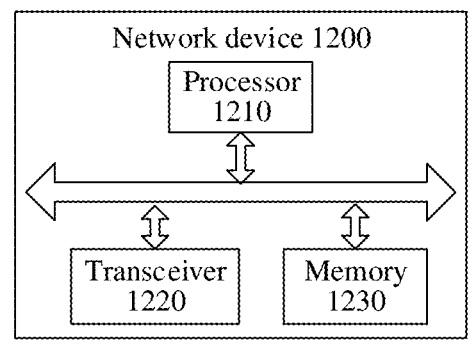
FIG. 14 is yet another schematic block diagram of a terminal device according to an embodiment of the application.

FIG. 14 is a schematic block diagram of a network device 1200 according to an embodiment of the application. As shown in FIG. 14, the network device 1200 includes: a processor 1210 and a transceiver 1220. The processor 1210 may be connected with the transceiver 1220. Optionally, the network device 1200 may further include a memory 1230. The memory 1230 may be connected with the processor 1210. The processor 1210, the memory 1230 and the transceiver 1220 may communicate with one another through an internal connecting path for transmission and control of data and/or signals. The memory 1230 may be configured to store an instruction. The processor 1210 is configured to execute the instruction stored in the memory 1230 to control the transceiver 1220 to transmit information or signals. The processor 1210 is configured to configure a granted resource for a first terminal device, the granted resource being a resource for transmitting data based on a specific TTI. The transceiver 1220 is configured to transmit resource grant information and information of the first corresponding relationship to the first terminal device, the resource grant information being used to indicate the granted resource, the first corresponding relationship information being used for the first terminal device to determine a target logical channel corresponding to the specific TTI, and the granted resource being configured for the first terminal device to transmit data born on the target logical channel to a second terminal device.

In such a manner, the network device of the embodiment of the application may transmit a granted resource to the first terminal device and may indicate a corresponding relationship between the granted resource and a specific TTI through information of the corresponding relationship to enable the first terminal device to transmit the data born on the target logical channel corresponding to the specific TTI with the other terminal device through the granted resource, so that transmission of some data based on the specific TTI is implemented, and a transmission delay may further be shortened.

Optionally, the processor 1210 may be configured to determine a corresponding relationship between the target logical channel and the specific TTI and configure the granted resource for the terminal device according to the corresponding relationship between the target logical channel and the specific TTI.

Optionally, the transceiver 1220 may be configured to, after the processor 1210 determines the corresponding relationship between the target logical channel and the specific TTI, transmit information of a second corresponding relationship to the first terminal device, the information of the second corresponding relationship being for the first terminal device to determine the corresponding relationship between the target logical channel and the specific TTI.

Optionally, the information of the second corresponding relationship may include a corresponding relationship between at least one logical channel group and the specific TTI, and each logical channel group of the at least one logical channel group includes multiple logical channels.

Optionally, the transceiver 1220 may be configured to receive information of a third corresponding relationship transmitted by the first terminal device. The processor 1210 is configured to determine the corresponding relationship between the target logical channel and the specific TTI according to the information of the third corresponding relationship.

Optionally, the information of the third corresponding relationship may include the corresponding relationship between the at least one logical channel group and the specific TTI, and each logical channel group of the at least one logical channel group includes multiple logical channels.

Optionally, a length of the specific TTI may be less than 1 ms.

It is to be understood that the network device 1200 according to the embodiment of the application may correspond to the network device 800 in the embodiment of the application and may correspond to a body executing the method 300 according to the embodiment of the application, and the abovementioned and other operations and/or functions of each unit in the network device 1200 are adopted to implement the corresponding flows executed by the network device in each method in FIG. 5 to FIG. 6 respectively and will not be elaborated herein for simplicity.

In such a manner, the network device of the embodiment of the application may transmit a granted resource to the first terminal device and may indicate a corresponding relationship between the granted resource and a specific TTI through information of the corresponding relationship to enable the first terminal device to transmit the data born on the target logical channel corresponding to the specific TTI to another terminal device through the granted resource, so that transmission of some data based on the specific TTI is implemented, and the transmission delay may further be shortened.

It is to be noted that the method embodiments of the application may be applied to a processor or implemented by the processor. The processor may be an integrated circuit chip with a signal processing capability. In an implementation process, each operation of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, operation and logical block diagram in the embodiments of the application may be implemented or executed. The universal processor may be a microprocessor or the processor may also be any conventional processor and the like. The operations of the methods in combination with the embodiments of the application may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the operations of the methods in combination with hardware.

It can be understood that the memory in the embodiment of the application may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

Those of ordinary skill in the art may realize that the units and algorithm steps of each example described in combination with the embodiments in the disclosure may be implemented by electronic hardware or a combination of computer software and the electronic hardware. Whether these functions are executed in a hardware or software manner depends on specific applications and design constraints of the technical solutions. Professionals may realize the described functions for each specific application through different methods, but such realization shall fall within the scope of the application.

Those skilled in the art may clearly learn about that specific working processes of the systems, devices and units described above may refer to the corresponding processes in the method embodiments and will not be elaborated herein for convenient and brief description.

In some embodiments provided by the application, it is to be understood that the systems, devices and methods above may be implemented in another manner. For example, the device embodiments described above are only schematic. For example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, which namely may be located in the same place, or may also be distributed to multiple network units. Part or all of the units may be selected to achieve the purpose of the solutions of the embodiments according to a practical requirement.

In addition, each functional unit in each embodiment of the application may be integrated into a processing unit, each unit may also physically exist independently, and two or more than two units may also be integrated into a unit.

When being realized in form of software functional units and sold or used as an independent product, the functions may also be stored in a computer-readable storage medium. Based on such an understanding, the technical solutions of the application substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the application. The storage medium includes: various media capable of storing program codes such as a U disk, a mobile hard disk, a ROM, a RAM, a magnetic disk or an optical disk.

The above is only the specific implementation mode of the application and not intended to limit the scope of protection of the application. Any variations or replacements apparent to those skilled in the art within the technical scope disclosed by the application shall fall within the scope of protection of the application. Therefore, the scope of protection of the application shall be subject to the scope of protection of the claims.

The invention claimed is:

1. A method for resource scheduling, comprising:
receiving, by a first terminal device, indication information and resource grant information from a network device, the resource grant information indicating a granted resource allocated to the first terminal device by the network device, and the indication information indicating that the granted resource is configured to transmit data born on a target logical channel; and
transmitting, by the first terminal device, the data born on the target logical channel to a second terminal device through the granted resource according to the indication information and the resource grant information,
wherein the indication information indicates that the granted resource is configured to transmit same data bearer corresponding to different logical channels, the granted resource comprises a first granted resource and a second granted resource, the target logical channel comprises a first logical channel and a second logical channel.

2. The method of claim 1, wherein
transmitting, by the first terminal device, the data born on the target logical channel to the second terminal device through the granted resource according to the indication information and the resource grant information comprises:
transmitting, by the first terminal device, first data born on the first logical channel to the second terminal device through the first granted resource; and transmitting, by the first terminal device, second data born on the second logical channel to the second terminal device through the second granted resource, the first logical channel and the second logical channel corresponding to same data bearer.

3. The method of claim 2, before transmitting, by the first terminal device, the data born on the target logical channel to the second terminal device through the granted resource according to the indication information and the resource grant information, further comprising:
determining, by the first terminal device, a first corresponding relationship between the first granted resource and a bearer of the first logical channel and a second corresponding relationship between the second granted resource and a bearer of the second logical channel.

4. The method of claim 3, wherein determining, by the terminal device, the first corresponding relationship and the second corresponding relationship comprises:
determining, by the first terminal device, a corresponding relationship between the first logical channel and a first carrier and a corresponding relationship between the second logical channel and a second carrier;
receiving, by the first terminal device, information of the first corresponding relationship transmitted by the network device;
determining, by the first terminal device, a corresponding relationship between the first carrier and the first granted resource and a corresponding relationship between the second carrier and the second granted resource according to the information of the first corresponding relationship;
determining, by the first terminal device, the first corresponding relationship according to the corresponding relationship between the first logical channel and the first carrier and the corresponding relationship between the first carrier and the first granted resource; and
determining, by the first terminal device, the second corresponding relationship according to the corresponding relationship between the second logical channel and the second carrier and the corresponding relationship between the second carrier and the second granted resource.

5. The method of claim 4, wherein determining, by the first terminal device, the corresponding relationship between the first logical channel and the first carrier and the corresponding relationship between the second logical channel and the second carrier comprises:
receiving, by the first terminal device, information of the second corresponding relationship transmitted by the network device; and
determining, by the first terminal device, the corresponding relationship between the first logical channel and the first carrier and the corresponding relationship between the second logical channel and the second carrier according to the information of the second corresponding relationship.

6. The method of claim 5, wherein
the information of the second corresponding relationship comprises a corresponding relationship between a first logical channel group and the first carrier, the first logical channel group comprises n logical channels, and the n logical channels comprise the first logical channel and do not comprise the second logical channel, n being a positive integer greater than 1; and/or
the information of the second corresponding relationship comprises a corresponding relationship between a second logical channel group and the second carrier, the second logical channel group comprise m logical channels, and the m logical channels comprise the second logical channel and do not comprise the first logical channel, m being a positive integer greater than 1.

7. The method of claim 3, wherein determining, by the terminal device, the first corresponding relationship and the second corresponding relationship comprises:
receiving, by the first terminal device, information of a fourth corresponding relationship transmitted by the network device; and
determining, by the first terminal device, the first corresponding relationship and the second corresponding relationship according to the information of the fourth corresponding relationship.

8. A method for resource scheduling, comprising:
configuring, by a network device, a granted resource for a first terminal device, the granted resource being configured for the first terminal device to transmit data to a second terminal device; and
transmitting, by the network device, resource grant information and indication information to the first terminal device, the resource grant information indicating the granted resource and the indication information indicating that the granted resource is configured to transmit data born on a target logical channel,
wherein the indication information indicates that the granted resource is configured to transmit same data bearer corresponding to different logical channels, the granted resource comprises a first granted resource and a second granted resource, the target logical channel comprises a first logical channel and a second logical channel.

9. The method of claim 8, wherein
the first granted resource is configured for the first terminal device to transmit first data born on the first logical channel to the second terminal device, and the second granted resource is configured for the first terminal device to transmit second data born on the second logical channel to the second terminal device, the first logical channel and the second logical channel corresponding to same data bearer.

10. The method of claim 9, further comprising:
determining, by the network device, a corresponding relationship between the first logical channel of the first terminal device and a first carrier and a corresponding relationship between the second logical channel and a second carrier;
determining, by the network device, a corresponding relationship between the first carrier and the first granted resource and a corresponding relationship between the second carrier and the second granted resource according to the corresponding relationship between the first logical channel and the first carrier and the corresponding relationship between the second logical channel and the second carrier; and
transmitting, by the network device, information of a first corresponding relationship to the first terminal device, the information of the first corresponding relationship being for the first terminal device to determine the corresponding relationship between the first carrier and the first granted resource and the corresponding relationship between the second carrier and the second granted resource.

11. The method of claim 10, after determining, by the network device, the corresponding relationship between the first logical channel and the first carrier and the corresponding relationship between the second logical channel and the second carrier, the method further comprising:

transmitting, by the network device, information of a second corresponding relationship to the first terminal device, the information of the second corresponding relationship being for the first terminal device to determine the corresponding relationship between the first logical channel and the first carrier and the corresponding relationship between the second logical channel and the second carrier.

12. The method of claim 11, wherein the information of the second corresponding relationship comprises a corresponding relationship between a first logical channel group and the first carrier, the first logical channel group comprises n logical channels, and the n logical channels comprise the first logical channel and do not comprise the second logical channel, n being a positive integer greater than 1; and/or, the information of the second corresponding relationship comprises a corresponding relationship between a second logical channel group and the second carrier, the second logical channel group comprise m logical channels, and the m logical channels comprise the second logical channel and do not comprise the first logical channel, m being a positive integer greater than 1.

13. The method of claim 9, further comprising:

transmitting, by the network device, information of a fourth corresponding relationship to the first terminal device, the information of the fourth corresponding relationship comprising the corresponding relationship between the first logical channel and the first granted resource and the corresponding relationship between the second logical channel and the second granted resource.

14. A network device, comprises:

a memory, configured to store instructions, a processor, configured to run the instructions stored in the memory; and a transceiver, connected with the processor and configured to transmit and receive information under control of the processor;

wherein the processor is configured to run the instructions stored in the memory to implement the operations the method of claim 8.

15. The network device of claim 14, wherein the first granted resource is configured for the first terminal device to transmit first data born on the first logical channel to the second terminal device, and the second granted resource is configured for the first terminal device to transmit second data born on the second logical channel to the second terminal device, the first logical channel and the second logical channel corresponding to same data bearer.

16. A terminal device, comprises:

a processor; and a transceiver, connected with the processor and configured to transmit and receive information under control of the processor;

wherein the transceiver is configured to:

receive indication information and resource grant information from a network device, the resource grant information indicating a granted resource allocated by the network device to the terminal device, and the indication information indicating that the granted resource is configured to transmit data born on a target logical channel; and transmit the data born on the target logical channel to a second terminal device through the granted resource according to the indication information and the resource grant information, wherein the indication information indicates that the granted resource is configured to transmit same data bearer corresponding to different logical channels, the granted resource comprises a first granted resource and a second granted resource, the target logical channel comprises a first logical channel and a second logical channel.

17. The terminal device of claim 16, wherein the transceiver is further configured to:

transmit first data born on the first logical channel to the second terminal device through the first granted resource; and transmit second data born on the second logical channel to the second terminal device through the second granted resource, the first logical channel and the second logical channel corresponding to same data bearer.

18. The terminal device of claim 17, wherein, before transmitting the data born on the target logical channel to the second terminal device through the granted resource according to the indication information and the resource grant information, the processor is configured to:

determine a first corresponding relationship between the first granted resource and a bearer of the first logical channel and a second corresponding relationship between the second granted resource and a bearer of the second logical channel.

19. The terminal device of claim 18, wherein the processor is further configured to:

determine a corresponding relationship between the first logical channel and a first carrier and a corresponding relationship between the second logical channel and a second carrier;

control the transceiver to receive information of the first corresponding relationship from the network device;

determine a corresponding relationship between the first carrier and the first granted resource and a corresponding relationship between the second carrier and the second granted resource according to the information of the first corresponding relationship;

determine the first corresponding relationship according to the corresponding relationship between the first logical channel and the first carrier and the corresponding relationship between the first carrier and the first granted resource; and determine the second corresponding relationship according to the corresponding relationship between the second logical channel and the second carrier and the corresponding relationship between the second carrier and the second granted resource.

20. The terminal device of claim 19, wherein the processor is further configured to:

control the transceiver to receive information of the second corresponding relationship from the network device; and determine the corresponding relationship between the first logical channel and the first carrier and the corresponding relationship between the second logical channel and the second carrier according to the information of the second corresponding relationship.

* * * * *